(12) United States Patent
Russell

(10) Patent No.: US 8,493,875 B2
(45) Date of Patent: Jul. 23, 2013

(54) SYSTEM AND METHOD FOR ESTIMATION OF ROUND TRIP TIMES WITHIN A TCP BASED DATA NETWORK

(75) Inventor: Raymond Russell, Dublin (IE)

(73) Assignee: Corvil Limited, Dublin (IE)

( * ) Notice: Subject to any disclaimer, the term of this patent is extended or adjusted under 35 U.S.C. 154(b) by 497 days.

(21) Appl. No.: 12/725,207

(22) Filed: Mar. 16, 2010

(65) Prior Publication Data
US 2010/0238828 A1 Sep. 23, 2010

(30) Foreign Application Priority Data
Mar. 23, 2009 (EP) ..................... 09155874

(51) Int. Cl.
*H04L 12/26* (2006.01)
(52) U.S. Cl.
USPC .......................................... 370/252; 709/224
(58) Field of Classification Search
USPC .................. 370/252; 709/223–225
See application file for complete search history.

(56) References Cited

U.S. PATENT DOCUMENTS

| 5,442,637 | A | * | 8/1995 | Nguyen | 714/708 |
| 7,185,099 | B1 | * | 2/2007 | Block | 709/230 |
| 7,436,778 | B1 | * | 10/2008 | Iannaccone et al. | 370/252 |
| 2002/0089930 | A1 | | 7/2002 | Parsa et al. | |
| 2002/0174216 | A1 | | 11/2002 | Shorey et al. | |
| 2004/0190449 | A1 | * | 9/2004 | Mannal et al. | 370/229 |
| 2005/0041581 | A1 | * | 2/2005 | Kuusinen et al. | 370/230 |
| 2005/0265235 | A1 | * | 12/2005 | Accapadi et al. | 370/235 |
| 2009/0185497 | A1 | * | 7/2009 | Arora et al. | 370/248 |
| 2009/0296589 | A1 | * | 12/2009 | Prescott et al. | 370/249 |

OTHER PUBLICATIONS

European Search Report, mailed May 26, 2009, for EP Patent Application 09155874.2.

* cited by examiner

*Primary Examiner* — Luat Phung
(74) *Attorney, Agent, or Firm* — Schwabe, Williamson & Wyatt, P.C.

(57) ABSTRACT

A system and method for estimation of round trip times (RTTs) within a TCP based data network is described. The system provides for a passive monitoring of the network round-trip latency by simply observing existing TCP connections in operation. In this way, it is possible to measure RTT out to a remote site without having to send any traffic to that site with the result that there is no impact on the network, and it is possible to estimate what production traffic is experiencing.

15 Claims, 3 Drawing Sheets

SYSTEM AND METHOD FOR ESTIMATION OF ROUND TRIP TIMES WITHIN A TCP BASED DATA NETWORK

CROSS REFERENCE TO RELATED APPLICATIONS

The present application claims foreign priority to EP Application 09155874.2 filed on Mar. 23, 2009.

FIELD OF THE INVENTION

The present invention relates to TCP based data networks and in particular to the transmission of data between a sender and recipient in such a data networks. The invention more particularly relates to a system and method for computing the round trip times for the transmission of data between a sender and recipient in such a data packet network.

BACKGROUND

TCP based data packet networks are ubiquitous in today's computing environment. The Transmission Control Protocol (TCP) is a fundamental protocol within the internet architecture and amongst its many tasks is to manage the transmission of data packets within a data network.

In the transmission of data packets within a network it is usual for the sender to wait a period of time for an acknowledgment from the recipient to ensure that the recipient did indeed receive the data packet. If the reply does not come within the expected period, the packet is assumed to have been lost and the data is retransmitted. There is therefore a requirement to estimate what should be the expected time.

To address this it is usual in TCP implementations to monitor the normal exchange of data packets so as to develop an estimate of what can be considered a typical expected time. Such a process is called Round-Trip Time (RTT) estimation. It will be appreciated that it is usual in network traffic for packets to be dropped thereby requiring transmission, what is important within the context of traffic management is to ensure that the time period established for generation of a retransmitted packet is not too short. RTT estimates are one of the most important performance parameters in a TCP based data network as if the RTT estimate is too low, packets are retransmitted unnecessarily; if too high, the connection can sit idle while the sender waits to timeout.

In a simple implementation of RTT estimation a sender sends a data packet to a recipient. On receipt of that data packet the recipient immediately sends an acknowledgement which is then received by the sender. The delay between the sending of the data packet and the receipt of the acknowledgement is the RTT estimate. This RTT estimate could be measured at any point between the sender and the recipient, insofar as that point is capable of detecting an outbound data packet and the acknowledgement associated therewith.

There are a number of challenges associated with RTT estimates many of which are based on what the recipient does on receipt of a data packet. It is known that a recipient may not immediately acknowledge each and every data packet received. They may for example delay an acknowledgement, aggregate a number of acknowledgements into one, reorder the acknowledgements or acknowledge retransmissions in which case the RTT estimator cannot ascertain accurately which data packet is being acknowledged. Any one of these challenges could result in an error in the estimated RTT which will have an effect on the management of the traffic within the data network.

It will be understood that this becomes more problematic in a low-latency environment where the network round-trip times can be of the order of a few milliseconds or less, but typical TCP implementations will use delayed-ack (d-ACK) timers of anywhere from 50 ms up to 500 ms. A naive measurement of round-trip time will see average network round-trip times of 25 ms to 250 ms, well off the mark.

There is therefore a need for an improved system and methodology for estimation of RTT within a packet based network.

SUMMARY

These and other problems are addressed by a system and methodology in accordance with the present teaching which provides for the estimation of round trip times within a packet based network by filtering the effects of delayed acknowledgements so as to give a more accurate estimate of the RTT measurements. Using the teaching of the present invention it is possible to filter out the delayed acks to provide an indication of real network RTT.

Accordingly, a first embodiment of the invention provides a monitoring system in accordance with claim 1. Advantageous embodiments are provided in the dependent claims. The invention also provides a method according to claim 9 with advantageous embodiments provided in the dependent claims thereto. A computer program in accordance with claim 12 is also provided.

These and other features and advantages of the present teaching will be better understood with reference to the exemplary arrangements which follow, which are provided to assist in an understanding of the present teaching but are not to be construed as limiting in any fashion.

BRIEF DESCRIPTION OF THE DRAWINGS

The present invention will now be described with reference to the accompanying drawings in which.

DETAILED DESCRIPTION OF THE DRAWINGS

The present invention provides a system and method for passively measuring RTT within a TCP packet network. It will be understood that a TCP packet is a sequence of bytes and consists of two sections: a header portion and a body potion. The header describes the packet's destination and typically comprises 11 distinct fields. These fields include unique fields for identification of the source and destination addresses the sequence number and the acknowledgement number associated with that packet.

The sequence number is typically a 32 bit number and in conventional packets has a dual role. If the SYN flag is set, then this indicates that this number is the initial sequence number and the sequence number of the first data byte is this sequence number plus 1. If the SYN flag is not set, then this indicates that this is the sequence number of the first data byte. In a similar fashion the acknowledgement number is also a 32 bit number. If the ACK flag is set then the value of this field within the packet header is the next expected byte that the receiver is expecting.

The present invention provides for a monitoring of the sequence number and acknowledgement number for individual data packets between two nodes in a network and uses this monitoring to provide an estimate of the RTT for data traffic between those nodes.

Figure 1:
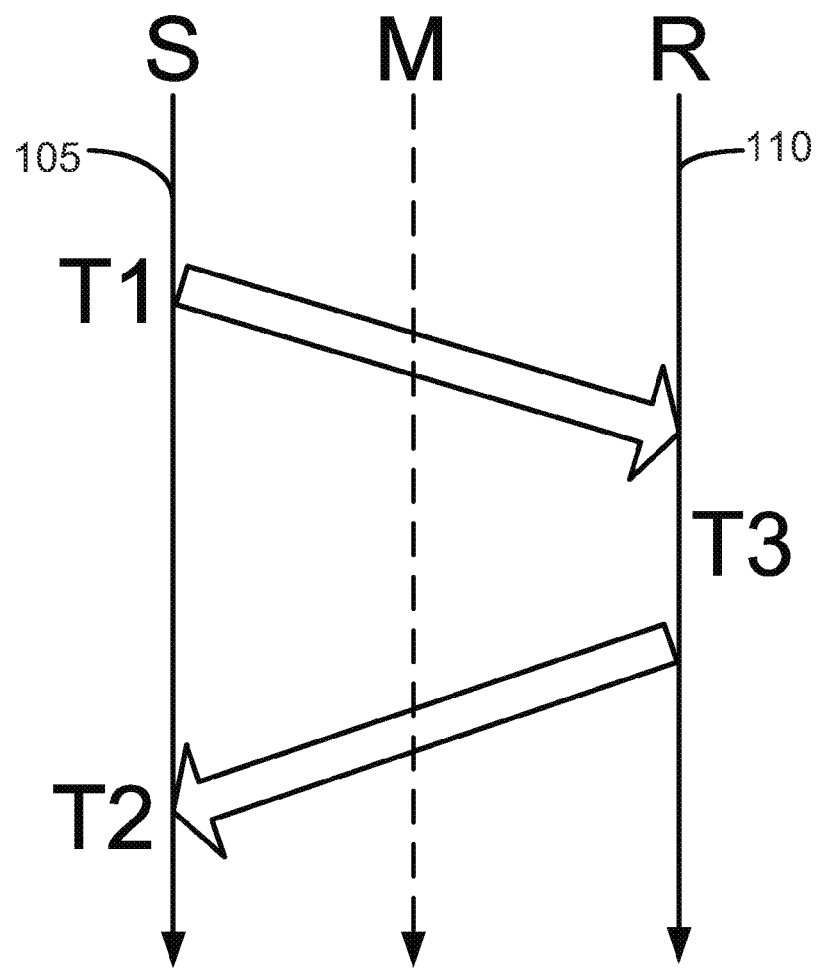
FIG. 1 is a schematic showing a typical packet flow between a first and second node in a TCP packet network.

FIG. 1 shows in schematic form a packet flow between a sender S (105) and a recipient R (110) within a data packet network. The sender sends a data packet 115 at time T1. This data packet is received at the recipient and some time, T3, later, the recipient sends an acknowledgement packet 120 back to the sender. This is received at the sender at time T2. The difference between T2 and T1 would typically be used to calculate the RTT. This time difference takes no account of the length of time T3 between recipient of the original packet and the sending of the acknowledgement.

In accordance with the present teaching a monitoring module 130 is provided within the data path between the sender and the recipient. While the schematic of FIG. 1 shows the monitoring module separate and distinct to each of the sender and recipient it will be appreciated that this is not a requirement. As long at the monitoring module can monitor the data traffic between the two nodes—sender and recipient—it can be located anywhere within the network.

Figure 2:
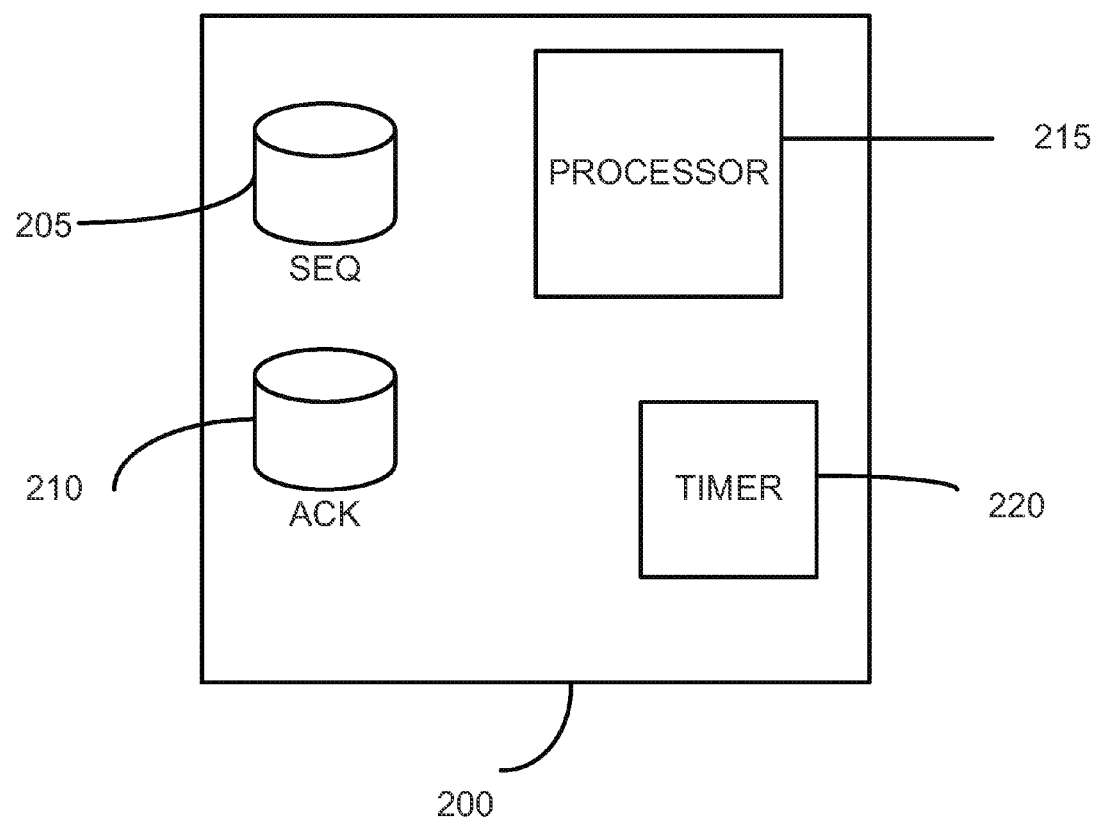
FIG. 2 is a schematic showing a monitoring module in accordance with the present teaching.

The monitoring module is configured to interrogate the header portions of the data packets being transmitted within the network. In accordance with the present teaching and as shown in schematic form in FIG. 2, a monitoring module 200 comprises a first data store 205 for storing details of sequence number SEQ for individual data packets, a second data store 210 for storing details of acknowledgement numbers ACK for individual packets and a timer 215 for associating time stamps with each of the details stored. A processor 220 is configured to use each of the first and second data stores so as to measure RTT times by setting a new timer each time new data SEQ is seen flowing out, and expire the timer whenever an ACK covering that sequence-number range returns.

It will be understood that TCP employs a cumulative ACK model where every ACK is used to acknowledge all data with sequence numbers lower than the ACK number. To address this feature of TCP, as each outgoing SEQ has a timer associated with it, on receipt of an ACK, an RTT is calculated only if the received ACK directly matches a SEQ. An additional filtering step may then be employed to check whether or not the ACK acknowledges more than one sequence number, and whether any of those other sequence numbers have established timers. If so these previous timers may be discarded, as the use of these timers to calculate a RTT time may result in inflated times being determined.

Using the information stored within the monitoring module it is possible for each sequence number identified as passing a TCP connection to provide a time for how long it takes to be acknowledged at the far end. It will be appreciated that this measurement is in effect a raw measurement in that it will sometimes correspond to a simple round-trip (that is, the time taken for a packet to travel out to the remote host, the host to generate an acknowledgement packet, and that packet to travel back), and sometimes not. Several aspects of TCP behaviour interfere with this simple round-trip phenomenology, but they can be filtered out to leave RTT measurements with properties similar to those measured from an initial three-way handshake.

In a preferred arrangement, the filtering is provided on a first and second level of filter. On a first analysis of the sequence and acknowledgement numbers for individual packets are compared and the value of the timer should be discarded unless the ACK is for exactly the end of the sequence number range recorded. Such a scenario corresponds with cumulative acknowledgements and provides an indication of the RTT where two or more packets are acknowledged using a single ACK response, as was discussed above.

A second filter provides for the discard of any timer information running for packets where the sequence number of the ACK received is greater than those still running. In this way any time an out-of-sequence packet is seen, any outstanding timers for sequence numbers at or beyond the start of the out-of-order packet should be discarded.

By restricting the calculation of the RTT based on a comparison of the sequence numbers for the outgoing and received acknowledgements it will be understood that the estimated RTT is based on a subset of all data traffic monitored between each of the two nodes.

Figure 3:
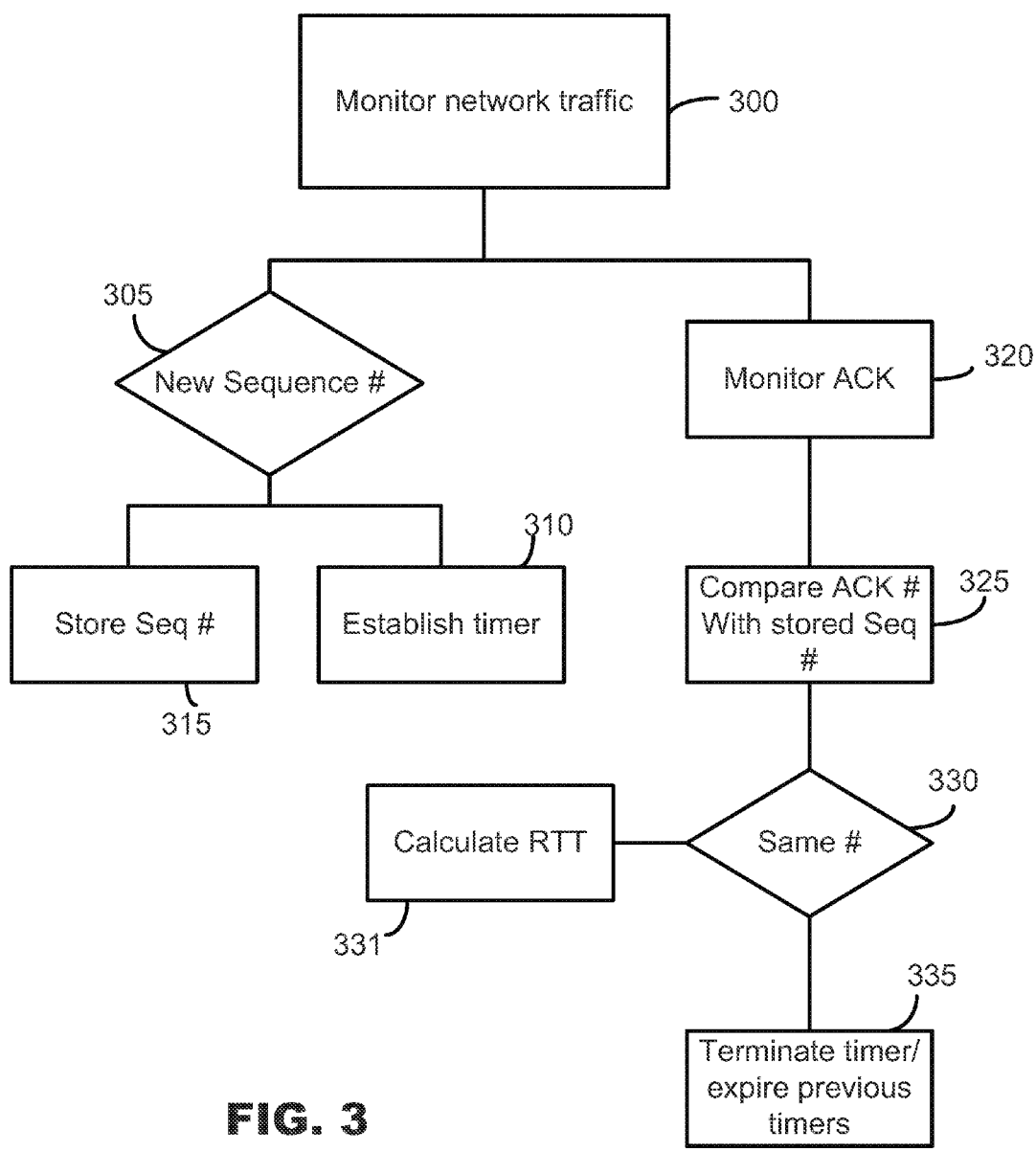
FIG. 3 is a process flow showing how RTT measurements may be calculated in accordance with the present teaching.

FIG. 3 shows an exemplary schematic showing a process flow that may be implemented within the monitoring module to provide information on RTT values.

In step 300 the monitoring module is configured for monitoring the network traffic between two nodes in the network—such as for example the S and R nodes of FIG. 1.

On interrogation of the header of each packet passing, it is established whether the sequence number of that header is a new sequence number or note (step 305). For each new sequence number, a timer is established (step 310) and the number of that sequence number SEQ is stored (step 315)

Concurrently with the interrogation of the sequence numbers of outgoing traffic, the module 200 is further configured to interrogate the headers of incoming packets to identify their acknowledgement number ACK (step 320).

For each new acknowledgement number ACK, the acknowledgement number ACK is compared with the stored sequence numbers (Step 325). If there are no prior timers running for older outgoing sequence numbers, that packet is isolated and the RTT is marked as potentially inflated as a result of the receiver R node's dACK timer If there is a timer running then it is assumed that the packet was acknowledged immediately and can be safely used. The existing timers are terminated and the shortest time is used as the estimate of the RTT. (Step 331)

On calculation of any RTT, any timers for prior sequence numbers are discarded as being representative of reordering and retransmissions at the receiving R node. (Step 335)

It will be understood that such techniques allow for the selection of a subset of all round trip monitored to provide an indication of the actual RTT to be expected within that network. By filtering data such that only those sequence numbers that are sequentially related are used, the measurement output of the monitoring module is filtered for the effects of cumulative ACKs, reordering and retransmission.

It will be appreciated from the discussion about Step 325 that on receipt of an ACK where there are a plurality of timers running for preceding SEQ's that the RTT is marked as potentially inflated as a result of the receiver R node's dACK timer. This assumption is based on the assumption that timers are expired on receipt of an ACK that directly acknowledges the sequence number against which the timer was established. In implementations where the administrator is confident that the receiver never delays ACKs, then such labelling as "potential inflated" may not be required as there will be a straight SEQ-out to ACK-back RTT and we can use the timer value. However if the receiver does implement delayed ACKs (dACKs), then the calculation of the RTT should preferably take cognisance of the fact that a timer may also cover the period of time for which the receiver was holding onto the ACK prior to releasing it back.

However, even if the receiver does delay ACKs, it will never do so for more than one packet at a time and as such if it is delaying an ACK, and it receives a new packet, it will then immediately generate an ACK covering both of them. On this basis, on comparison of the received ACK with the running timers for outgoing SEQs, it is possible to detect when this happens by seeing that a returning ACK directly acknowledges one timer and also expires one or more previously outstanding timers too.

It will be appreciated that such a check to see if any prior timers are expired is something that may be implemented to ensure that the measurements are not inflated by delayed ACKs. The downside for such an arrangement or filter of possible measurements is that it may result in a discard of many (or all) of the possible measurements. However, if it is known that no ACKs are delayed, it is possible to skip the check and get many more RTT measurements which will improve the statistical measurement of the actual RTT times recorded.

It will be appreciated that the measurements can also be used to detect whether delayed ACKs are turned off: If they are, there should be no difference in profile between the filtered and the unfiltered measurements. If the methodology of the present teaching is implemented in an environment where dACKs are implemented, they are usually evident and analysis of the make-up of the calculations determining the RTT estimate may be used to effect that determination or whether the environment is one where dACK is implemented or not.

It will be appreciated that a methodology for measurement of RTT within a TCP environment as provided in accordance with the present teaching makes use of existing packets within the data network and does not require an injection of additional traffic into the network to provide the analysis of the network performance. In this way the measurement are passive measurements and are a reflection of how actual data traffic is being handled within the network. As the measurement is a reflection of the actual traffic it can be used to determine accurately throughout the period of transmission of data within the network whether there is any diminution of service within the network. Such a methodology can be used to replace the existing RTT estimator within a functioning TCP stack.

However in a preferred implementation a methodology provided in accordance with the present teaching would be employed in tandem or parallel with existing RTT measurements used within the network architecture. By employing a system such as that provided in accordance with the present teaching it is possible to passively monitor the network round-trip latency by simply observing existing TCP connections in operation. As was detailed above, an advantage of a system employing the current methodology is that it is possible to measure RTT out to a remote site without having to send any traffic to that site with the result that there is no impact on the network, and it is possible to see what production traffic is experiencing. However there is no reason that a system employing the teaching of the present invention could not be used within a TCP stack and, if employed could significantly improve the performance of the stack.

It will be appreciated that exemplary arrangement of a methodology provided in accordance with the present teaching will be implemented on one or more computer hardware and/or software components. Such a system advantageously employs passive measurement of traffic within a network to provide an estimation of RTT times for traffic within that network. While exemplary arrangements have been described it will be understood that modifications can be made without departing from the scope of the present teaching which is to be limited only as is deemed necessary in the light of the appended claims.

The words comprises/comprising when used in this specification are to specify the presence of stated features, integers, steps or components but does not preclude the presence or addition of one or more other features, integers, steps, components or groups thereof.

The invention claimed is:

1. A monitoring system for monitoring the round trip time of data packets travelling between a first node and second node within a packet based network, the system comprising:
   a. A first module configured to interrogate traffic originating from the first node and to extract and store sequence numbers from individual packet headers;
   b. A timer module configured to initiate a timer on extraction of sequence numbers; and
   c. A second module configured to interrogate acknowledgements from the second node relating to the traffic sent, and to stop the timer on identification of an acknowledgment relating to a stored sequence number so as to provide an estimate of the round trip time of packets travelling between the first and second nodes;
   wherein the system is configured to effect, for each new acknowledgement, a comparison of the new acknowledgement with the stored sequence number and on identification of a situation where no prior timers are running for older outgoing sequence numbers to isolate the packet associated with that acknowledgement and mark the return trip time for that packet as being potentially inflated.

2. The system of claim 1 wherein the timer module is configured to initiate an individual timer for each extracted sequence numbers, the individual timers being uniquely associated with specific sequence numbers.

3. The system of claim 2 wherein timer module is configured to store the individual timers relative to their duration.

4. The system of claim 2 wherein on receipt of an acknowledgement for a specific sequence number, the timer specific to that sequence number is stopped and the elapsed time is used to determine the round trip time for a data packet within the network.

5. The system of claim 4 wherein on stopping a timer for a specific sequence number, the system is configured to stop all other existing timers having an expired duration greater than the stopped timer.

6. The system of claim 1 wherein the timer module is configured to have concurrently running a plurality of timers, each timer being associated with specific outgoing traffic from the first node.

7. The system of claim 1 being configured to be located within the network intermediate the first and second nodes, such that monitored data packets are passively measured en route between the first and second nodes.

8. The system of claim 1 being configured to be co-located with the first node such that prior to or concurrent with the transmission of the data packet from the first node to the second node, the timer module has initiated a timer for that packet.

9. A method of passively monitoring the round trip time of data packets travelling between a first node and second node within a packet based network, the method comprising:
   a. Interrogating traffic originating from the first node so as to extract and store sequence numbers from individual packet headers;
   b. Initiating a timer on extraction of a sequence number from a packet header;

c. Interrogating acknowledgements from the second node relating to the traffic sent to that node so as to extract acknowledgement numbers from individual packet headers;
d. Comparing the acknowledgement numbers with the stored sequence numbers;
e. Stopping the timer for a specific sequence number on receipt of an acknowledgement number for the sequence number of that timer;
f. Using the elapsed time on that timer for an estimation of the round trip time of packets between the first and second nodes; and
g. For each received acknowledgement number, identifying timers for older sequence numbers and marking the calculated round trip time for that packet as being potentially inflated on identification that no such timers exist.

10. The method of claim 9 further comprising;
a. On stopping the timer for a specific sequence number, expiring all running timers having a duration greater than the stopped timer.

11. An article of manufacture with a non-transitory computer usable medium having computer readable program instructions embodied therein, the program instructions being configured to passively monitor the round trip time of data packets travelling between a first node and second node within a packet based network, the program instructions causing a processor to execute the following:
a. Interrogate traffic originating from the first node so as to extract and store sequence numbers from individual packet headers;
b. Initiate a timer on extraction of a sequence number from a packet header;
c. Interrogate acknowledgements from the second node relating to the traffic sent to that node so as to extract acknowledgement numbers from individual packet headers;
d. Compare the acknowledgement numbers with the stored sequence numbers;
e. Stop the timer for a specific sequence number on receipt of an acknowledgement number for the sequence number of that timer;
f. use the elapsed time on that timer for an estimation of the round trip time of packets between the first and second nodes; and
g. For each received acknowledgement number, identify timers for older sequence numbers and mark the calculated round trip time for that packet as being potentially inflated on identification that no such timers exist.

12. An article of manufacture having computer readable instructions embodied therein which when executed are configured to carry out the method steps of claim 9.

13. The system of claim 1 further comprising a filter configured to check whether an interrogated acknowledgement acknowledges more than one stored sequence number and, if such checks identifies other stored sequence numbers having established timers, discard such previous timers.

14. The system of claim 1 comprising a filter configured to identify an out-of-sequence packet and discard any outstanding timers for sequence numbers at or beyond the start of the out-of-order packet.

15. The method of claim 9 further comprising identifying an out of sequence packet and discarding outstanding timers for sequence numbers at or beyond the start of the identified out of sequence packet.

* * * * *